United States Patent
Paquette et al.

(10) Patent No.: US 12,448,477 B2
(45) Date of Patent: Oct. 21, 2025

(54) SYNTHETIC METHOD FOR THE PREPARATION OF RHEOLOGICAL MODIFYING POLYMERS AND THE USE THEREOF

(71) Applicant: POLYANALYTIK INC., London (CA)

(72) Inventors: Joseph A. Paquette, London (CA); Olabode O. Oyeneye, London (CA); Eric D. Landry, London (CA); Amer Ebied, London (CA)

(73) Assignee: POLYANALYTIK INC.

( * ) Notice: Subject to any disclaimer, the term of this patent is extended or adjusted under 35 U.S.C. 154(b) by 481 days.

(21) Appl. No.: 17/261,122

(22) PCT Filed: Jul. 17, 2019

(86) PCT No.: PCT/CA2019/050989
§ 371 (c)(1),
(2) Date: Jan. 18, 2021

(87) PCT Pub. No.: WO2020/014785
PCT Pub. Date: Jan. 23, 2020

(65) Prior Publication Data
US 2021/0317249 A1    Oct. 14, 2021

Related U.S. Application Data

(60) Provisional application No. 62/699,033, filed on Jul. 17, 2018.

(51) Int. Cl.
| | |
|---|---|
| C09K 8/80 | (2006.01) |
| A61K 8/81 | (2006.01) |
| A61K 47/32 | (2006.01) |
| C02F 1/56 | (2023.01) |
| C08F 293/00 | (2006.01) |
| C08J 3/075 | (2006.01) |
| C09K 8/588 | (2006.01) |
| C09K 8/88 | (2006.01) |
| D21H 17/43 | (2006.01) |
| D21H 21/10 | (2006.01) |
| D21H 21/18 | (2006.01) |
| E21B 43/20 | (2006.01) |
| E21B 43/267 | (2006.01) |

(52) U.S. Cl.
CPC .......... *C08F 293/005* (2013.01); *A61K 8/817* (2013.01); *A61K 47/32* (2013.01); *C02F 1/56* (2013.01); *C08J 3/075* (2013.01); *C09K 8/588* (2013.01); *C09K 8/80* (2013.01); *C09K 8/882* (2013.01); *D21H 17/43* (2013.01); *D21H 21/10* (2013.01); *D21H 21/18* (2013.01); *E21B 43/20* (2013.01); *E21B 43/267* (2013.01); *A61K 2800/48* (2013.01); *C08F 2438/03* (2013.01)

(58) Field of Classification Search
CPC .............. C08F 293/005; C08F 2438/03; C08F 220/56; C08F 2/10; C08F 2/48; C08F 220/02; A61K 8/817; A61K 47/32; A61K 2800/48; A61K 8/8158; A61K 2800/10; A61K 2800/548; C02F 1/56; C02F 1/40; C02F 2103/10; C02F 2103/365; C02F 11/147; C08J 3/075; C09K 8/588; C09K 8/80; C09K 8/882; C09K 8/88; C09K 8/68; D21H 17/43; D21H 21/10; D21H 21/18; D21H 17/375; E21B 43/20; E21B 43/267; A61Q 19/00
See application file for complete search history.

(56) References Cited

U.S. PATENT DOCUMENTS

| | | | |
|---|---|---|---|
| 4,694,046 | A | 9/1987 | Bock et al. |
| 4,734,205 | A | 3/1988 | Jacques et al. |

(Continued)

FOREIGN PATENT DOCUMENTS

| | | |
|---|---|---|
| CA | 2022181 | 1/1992 |
| CN | 1513890 A | 7/2004 |

(Continued)

OTHER PUBLICATIONS

Zhao (Zhao et. al., "A Novel Hydrophobic polymer by RAFT-Madix Copolymerization for Fracturing Fluids With High Thermal Stability", Energy Fuels, 2018, vol. 32, pp. 3039-3051).*

Zhao, J. et al. "A Novel Hydrophobic Polymer by RAFT-Madix Copolymerization for Fracturing Fluids With High Thermal Stability", Energy Fuels, Feb. 9, 2018, vol. 32, pp. 3039-3051.

(Continued)

*Primary Examiner* — Kumar R Bhushan
(74) *Attorney, Agent, or Firm* — Stratford Group Ltd.

(57) ABSTRACT

The invention relates to a UV-initiated RAFT-type polymerization for producing hydrophobically associative terpolymers in an aqueous solution. The terpolymers produced by this method can be used as aqueous rheological modifiers. Specifically, the invention relates to a hydrophobically associating terpolymers and a method to produce same using a light initiated iniferter. The monomers used in the present invention are selected from: a monomer having a water-soluble monoethylenically unsaturated group; a monomer having an ionic water-soluble monoethylenically unsaturated group; and a monomer having a monoethylenically unsaturated monomer capable of forming hydrophobically associative bonds in aqueous medium. The iniferter is initiated with light of wavelength between 250-400 nm. The resultant terpolymer is produced in a cost-effective, simple, and one-step process and can be used to thicken aqueous mediums with less or equal amounts of polymer than currently available.

14 Claims, 5 Drawing Sheets

(56) References Cited

U.S. PATENT DOCUMENTS

| | | | |
|---|---|---|---|
| 4,889,887 A * | 12/1989 | Fan | C08L 33/26 |
| | | | 525/157 |
| 4,921,903 A | 5/1990 | Fong et al. | |
| 4,981,936 A | 1/1991 | Good et al. | |
| 2013/0324443 A1 * | 12/2013 | Wang | C04B 24/2688 |
| | | | 166/305.1 |
| 2014/0378617 A1 * | 12/2014 | Wilson | C09K 8/882 |
| | | | 525/291 |

FOREIGN PATENT DOCUMENTS

| | | |
|---|---|---|
| CN | 101054429 A | 10/2007 |
| CN | 105646777 A | 6/2016 |
| EA | 24043 B1 | 8/2016 |
| EP | 2287216 A1 | 2/2011 |
| JO | 2003522816 A | 7/2003 |
| JP | H10306123 A | 11/1998 |
| JP | 2000515181 A | 11/2000 |
| JP | 2003522816 A | 7/2003 |
| JP | 2008-505234 A | 2/2008 |
| JP | 2013505308 A | 2/2013 |
| JP | 2016510347 A | 4/2016 |
| WO | 2009095245 A2 | 8/2009 |
| WO | 2010033795 A2 | 3/2010 |
| WO | 2012/061147 A1 | 5/2012 |
| WO | 2012069478 A1 | 5/2012 |

OTHER PUBLICATIONS

Branham, K.D. et al. "Water-Soluble Copolymers. 64. Effects of pH and Composition on Associative Properties of Amphiphilic Acrylamide/Acrylic Acid Terpolymers", Macromolecules, 1996, vol. 29, pp. 254-262.

Xu, Jiangtao et al., "Catalyst-Free Visible Light Induced Raft Photopolymerization", Chapter 13 in Matyjaszewski et al.; Controlled Radical Polymerization: Mechanisms, ACS Symposium Series; American Chemical Society, Washington, DC, 2015, pp. 247-267.

Tian, X. et al. "Recent Advances in RAFT Polymerization: Novel Initiation Mechanisms and Optoelectronic Applications" Polymers, Mar. 14, 2018, vol. 10, No. 318, pp. 1-26.

Extended European Search Report from corresponding EP application No. 19837199.9, Apr. 12, 2022.

Carmean R. Nicholas et al., Ultra-High Molecular Weights via Aqueous Reversible-Deactivation Radical Polymerization, Chem, Jan. 12, 2017, vol. 2, p. 93-101.

Office Action dated Apr. 6, 2022 in respect of corresponding Chinese Patent Application No. 2019800606703 filed Mar. 16, 2021, 3 pages.

Office Action issued Feb. 7, 2023 for corresponding JP application No. 2021-502986.

Office Action issued Feb. 17, 2023 for corresponding CN application No. 2019800606703.

Search Report in respect of corresponding Russian Patent Application No. 2021101358 filed Jul. 17, 2019, 2 pages.

Office Action issued Oct. 31, 2023 for corresponding JP application No. 2021-502986.

International Search Report and the Written Opinion for PCT/CA2019/050989 mailed Sep. 19, 2019, 7 pages.

Zhao, J. et al "A Novel Hydrophobic Polymer by RAFT-Madix Copolymerization for Fracturing Fliuds With High Thermal Stability", Energy Fuels, Feb. 9, 2018, vol. 32, pp. 3039-3051.

Branham, K.D. et al. "Water-Soluble Copolymers 64. Effect of pH and Composition on Associative Properties of Amphiphilic Acrylamide/Acrylic Acid Terpolymers", Macromolecules, 1996, vol. 29, pp. 254-262.

Xu, Jiangtao et al. "Catalyst-Free Visible Light Induced Raft Photopolymerization", Chapter 13 in Matyjaszewski et al.: Controlled Radical Polymerization: Mechanisms, ACS Symposium Series; American Chemical Society, Washinton, DC, 2015, pp. 247-267.

Tian, X et al. "Recent Advances in RAFT Polymersization: Novel Initiation Mechanisms and Optoelectronic Applications" Polymers, Mar. 14, 2018, vol. 10, No. 318, pp. 1-26.

Office Action issued Dec. 6, 2024 for corresponding JP application No. 2024-003790.

Office action issued Jan. 26, 2025 for corresponding BH application no. 20210010.

Office action issued Feb. 10, 2025 for corresponding AU application No. 2019306752.

* cited by examiner monomer A    Monomer B    Monomer C               terpolymer from Example 1

SYNTHETIC METHOD FOR THE PREPARATION OF RHEOLOGICAL MODIFYING POLYMERS AND THE USE THEREOF

REFERENCE TO PENDING APPLICATION

This application claims benefit of prior-filed U.S. provisional application No. 62/699,033.

FIELD OF THE INVENTION

The present disclosure relates to a novel UV-initiated RAFT-type polymerization for producing hydrophobically associative terpolymers in an aqueous and facile synthetic method and in particular is concerned with the production of polymers for use as aqueous rheological modifiers.

BACKGROUND

There are many industrially relevant applications for the rheological modification of aqueous solution to obtain the desired viscosities tailored to a specific application. These rheological modifiers, which are often polymers, can be used as additive in cosmetics, as cleaning agents in waste-water treatment plants, as retention agents in paper making and as rheological modifiers in enhanced oil recovery, to name a few examples.

A common example of this is for fluids used in stimulation of oil and gas wells are designed to open fractures and transport proppant into the fracture. The use of water alone does not allow for efficient transport due to its relatively low viscosity. A rheological modifier is used to improve the overall hydrocarbon capture in the reservoir. To achieve the desired rheological properties, often a polymer that increases the viscosity of the fluid is used.

Various polymers have been used to increase the viscosity of the aqueous medium, typically a polyacrylamide-based system including an ionic portion made up of acrylate or a sulfate-based acrylamide. These copolymers have a great performance in water with low total dissolved solids (TDS), however, they have greatly decreased viscosifying properties when encountering a well with high TDS, especially in the presence of divalent cationic salts. To counteract this effect, the introduction of hydrophobic groups into these polymers allow for greater viscosity in wells with high TDS. These polymers associate in solution based on intermolecular hydrophobic interactions that behave as pseudo-cross-linker in an aqueous solution to which an increase in viscosity in fresh water and a significant improvement to the viscosity in the presence of mono- and di-valent cations in solution is observed.

Current technology for polymers that increase the viscosity of a target solution require additives (i.e. surfactants, amphiphilic non-polymerizable compounds, RED/OX initiation systems) or several synthetic steps (i.e. synthesis of macro-initiators or macro chain transfer agents: macro-CTA) to successfully achieve their final targeted physical properties. The present invention has for a goal to produce ultra-high molecular weight polymers ($>1.0\times10^6$ g/mol) without the requirement for additives or extra synthetic steps in aqueous medium.

Presently, one of the most common ways to synthesize these hydrophobically associative water-soluble polymers (HAPs), also known as amphiphilic polymers or associative polymers, is to use a controlled free radical polymerization. More specifically, a reversible addition fragmentation chain transfer/macromolecular design by the interchange of xanthates (RAFT/MADIX).

Prior art describing this process includes Taton et al., Macromol. Rapid Commun. 22, 1497-1503, 2001 have developed a method using MADIX technology to obtain well-defined copolymers based on acrylic acid and acrylamide monomer units. As an example, in a typical experiment, 1.0 g ($4.86\times10^3$ mol) of xanthate 1 {methyl 2-[(ethoxycarbonothioyl)thio]-propanoate}, 24.2 g (0.336 mol) of acrylic acid, 0.250 g ($9.66\times10^{-4}$ mol) of 4,49-azo (4-cyanopentanoic acid) and 73 g of a mixture of deionized water and isopropyl alcohol (4:1 v/v) were introduced in a two-necked flask, degassed under nitrogen and heated at 70° C. for 8 h. The use of xanthates in the MADIX process is described as an alternative route for the direct and facile synthesis of well-defined functional statistical, di- and tri-block copolymers comprising acrylamide and acrylic acid units. This polymerization, however, only gave access to polymers with Mn ~10,000 g mol$^{-1}$ and required the use of an organic solvent, isopropyl alcohol.

Read et al., Polym. Chem. 5, 2202-2207, 2014, were able to produce p(AM-stat-AMPS) statistical copolymers in the range of $10^5$-$10^6$ g mol$^{-1}$. The polymerizations were performed in a purely aqueous medium with a low molar mass hydrophilic macro-RAFT/MADIX agents (noted P7-XA1 for oligo(acrylamides) of $DP_n$ ~7, which was synthesized from the hydrophobic O-ethyl-S-(1-methoxycarbonyl)ethyl dithiocarbonate agent (Rhodixan A1® from Solvay) and used as mediating agent. The syntheses relied on a low temperature, redox initiation based on ammonium persulfate/sodium formaldehyde sulfoxylate dihydrate (APS/NaFS, 50/50, w/w) as the oxidant/reducing agent pair.

Cadix et al., SPE-174210-MS, describes a micellar solution of surfactant that was prepared by solubilizing a fixed amount of surfactant, sodium dodecyl sulphate (SDS) in water. Next, the hydrophobic monomer (comprises a polymerizable component, typically comprised of an acrylamido group, a hydrophobic component and a connection between the two) was added to the micellar solution and the mixture stirred at ambient temperature or in a warm water bath (35° C.). Next, a solution of hydrophilic monomers (AM and AMPS) was prepared in water at the required monomer composition and solids content typically in the range of 10-35 wt %. To this solution was added the micellar solution of hydrophobic monomer, the quantity being added was calculated to achieve the required theoretical composition of hydrophobic monomer in the final polymer ($M_{n\ theoretical}$= $2.0\times10^6$ g mol$^{-1}$). The reaction mixture was stirred at ambient temperature until a homogenous solution was obtained whereupon Rhodixan A1 O-ethyl-S-(1-methoxycarbonylethyl) xanthate (MADIX transfer agent) was added in a quantity calculated from the targeted theoretical molecular weight. The reaction mixture was then initiated using an aqueous based RED/OX type initiating system and allowed to polymerize under "pseudo-adiabatic" conditions overnight.

US2012/0129739 A1 discussed a water-soluble HAP that is comprising a monoethylenically unsaturated, water-soluble, surface-active monomer (a), and a monoethylenically unsaturated, hydrophilic monomer (b) different from monomer (a). The copolymer is prepared in the presence of a nonpolymerizable surfactant and has marked thickening properties in aqueous systems. This system, however, requires a non-polymerizable additive to achieve any significant thickening behaviour.

Carmean et. al., Chem 2, 93-101, 2017, describe a method that utilises mild UV irradiation of thiocarbonylthio and xanthate compounds in the presence of acrylamido monomers, to produce ultra-high-molecular weight (UHMW) polymers. They use aqueous conditions, that result in well-controlled UHMW polymers for controlled radical polymerizations (i.e. RAFT polymerization). This photomediated RAFT polymerization approach reaches number-average molecular weights in excess of $8 \times 10^6$ g mol$^{-1}$ with degrees of polymerization above 85,000. This disclosure specifically deals with the synthesis of poly(dimethylacrylamide) (PDMA). The photo-mediated polymerization discussed uses a RAFT agent to produce the polymer in the UHMW range, also at low temperatures and relatively fast reaction times. This methodology, however, does not discuss the synthesis of any polymers other than poly(dimethylacrylamide).

The RAFT/MADIX polymerization method has been used to create a variety of hydrophobically associative copolymer and terpolymer to improve the rheological performance of fluids in hydrocarbon capture. These polymerizations, however, require the use of a RED/OX mediated initiation, the requirement of elevated temperatures (e.g. 70° C.), the use of either a macro-CTA or surfactants to produce micelles required for molecular weight control of the polymers produces. These methods produce more steps and a greater cost to the preparation of the polymers.

Despite all prior art in field of HAP and RAFT polymerization, certain challenges remain relating to increasing the molecular weight of HAP without the need for complicated micellar systems, RED/OX initiators, or macro-CTA. In particular, the current invention will propose a polymer and methodology that provides a novel combination of elements to produce a terpolymer in a one-pot aqueous reaction that achieves superb thickening properties due to hydrophobic associative interactions, processability, ease-of-synthesis, and a single iniferter to perform initiation/propagation of the terpolymer system.

The content of all documents referred to are hereby incorporated by reference in their entirety for all purposes.

BRIEF SUMMARY

It is an object of the present invention to provide a synthetic method for the creation of terpolymers for rheological modification of aqueous solutions.

In accordance with an aspect of the current invention there is provided a terpolymer resulting from the polymerization of a mixture of monomers selected from: monomer A, having a water-soluble monoethylenically unsaturated group; monomer C, having an ionic water-soluble monoethylenically unsaturated group; and monomer B, having a monoethylenically unsaturated monomer capable of forming hydrophobically associative bonds in aqueous medium and amenable to aqueous polymerization conditions.

In accordance with an additional aspect of the present invention there is provided a process for the preparation of a terpolymer comprising the steps of:
i. combining of a mixture of monomers selected from the group comprising;
monomer A, having a water-soluble monoethylenically unsaturated group,
monomer C, having an ionic water-soluble monoethylenically unsaturated group, and
monomer B, having a monoethylenically unsaturated monomer capable of forming hydrophobically associative bonds in aqueous medium and amenable to aqueous polymerization conditions;
with an iniferter selected from the group comprising $R^{1'}$—(C=S)—S—$Z^1$ or $R^{2'}$—S—(C=S)—S—$Z^2$ in which;
$R^{1'}$ is methoxy, ethoxy, n-propoxy, iso-propoxy, n-butoxy, iso-butoxy, t-butoxy, benzyl, phenyl, N-methylaniline,
$Z^1$ is propanoic acid, propanoate, phenylpropane-2-yl, cyanomethyl, cyanopropan-2-yl,
$R^{2'}$ is a linear or branched alkyl chain (carbon length between C1-C12), benzyl, phenyl, isobutyronitrile, propanoate, propanoic acid, benzyl isobutyrate, 2-(pyridin-2-yldisulfanyl) ethyl propionate,
$Z^2$ is propanoate, propanoic acid, methyl, ethyl, propyl, butyl, pentyl, hexyl, phenyl, benzyl, benzyl isobutyrate, PEGylated 2-cyanopropanoic acid, to produce a reaction mixture;
ii. sparging the reaction mixture with an inert gas; and
iii initiating the iniferter with light of wavelength between 250-400 nm.

In accordance with an additional aspect of the present invention there is provided a method for thickening a water-based solution by adding thereto a sufficient amount of the terpolymer of according to an aspect of the invention the present invention to thicken the water-based solution.

In accordance with a further embodiment of the present invention there is provided a method wherein the water-based solution of the invention is used to transport a proppant, typically sand, treated sand, or man-made ceramic materials, and the proppant functioning to keep an induced hydraulic fracture open.

In accordance with a further aspect of the present invention there is provided use of the terpolymer according to an aspect of the invention to enhance oil recovery by injecting a water-based solution comprising the terpolymer in a concentration of 0.01-5% by weight through at least one injection well into a mineral oil deposit and removing crude oil from the deposit through at least one production well.

In accordance with a further embodiment of the present invention there is provided a terpolymer, wherein the monomer A in is present in an amount of from 25.0-99.9% by mol, the monomer C is present in an amount of from 25.0-99.9% by mol, and the monomer B is present in an amount of from 0.1-5.0% by mol, each based on the total molar amount of all components in the copolymer.

In accordance with a further embodiment of the present invention there is provided a process for preparation of a terpolymer wherein the preparation is conducted in a solvent system consisting of water and a polar protic or polar aprotic solvent with a range of water to polar protic or polar aprotic solvent between 100/0-51/49.

In accordance with yet a further embodiment of the present invention there is provided use of the terpolymer according to an aspect of the invention to adjust the viscosity of a cosmetic preparation or a pharmaceutical additive or preparation.

In accordance with additional embodiments of the present invention there is provided use of the terpolymer according to an aspect of the invention in the treatment of water, waste water, of for the removal of unwanted impurities from a solution.

In accordance with additional embodiments of the present invention there is provided use of the terpolymer according to an aspect of the invention in paper making, as retention aids and reinforcing agents.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
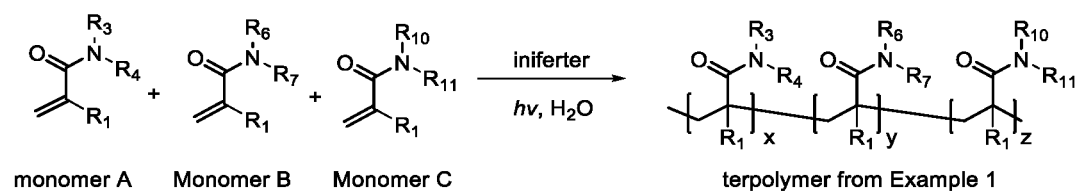
FIG. 1: Example of synthetic method to produce hydrophobically associating terpolymers.

While the present disclosure is susceptible to various modifications and alternative forms, specific embodiments or implementations have been shown by way of example in the drawings and will be described in the detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

The object of embodiments of this invention is to provide a hydrophobically associating terpolymer that in a cost-effective, simple, and one-step process that can thicken aqueous medium with less or equal amounts of polymer than currently available.

This objective is achieved by using a water soluble, UV-initiated iniferter in a one-pot synthesis, at ambient temperature to give UHMW polymers, typically within 2 hours, consisting of:

monomer A, having a water-soluble monoethylenically unsaturated group;

monomer C, having an ionic water-soluble monoethylenically unsaturated group, different than monomer A; and monomer B, having a monoethylenically unsaturated monomer capable of forming hydrophobically associative bonds in aqueous medium and soluble in aqueous polymerization conditions, where monomer A is $R^1$—(C═C)—(C═O)—O—$R^2$ or $R^1$—(C═C)—(C═O)—N—($R^3$)—$R^4$ where monomer B is $R^1$—(C═C)—(C═O)—O—$R^5$ or $R^1$—(C═C)—(C═O)—N—($R^6$)—$R^7$ or $R^1$—(C═C)—(C═O)—$R^8$ where monomer C is $R^1$—(C═C)—(C═O)—O—$R^9$ or $R^3$—(C═C)—(C═O)—N—($R^{10}$)—$R^{11}$ or $R^1$(C═C)—$R^{12}$ $R^1$ is H or methyl, $R^2$ is methyl, ethyl, propyl, butyl, epoxymethyl, methanol, ethanol, N,N-dimethylethyl, PEG (where the molecular weight is between 50-1000 g/mol), benzyl, phenyl, $R^3$ is H, methyl, or ethyl, $R^4$ is H, methyl, ethyl, isopropyl, propan-2-ol, $R^5$ is H, methyl, ethyl, propyl, butyl, pentyl, hexyl, C9-C24 linear or branched chains, $R^6$ is poly (ethylene glycol) n (where n is between 2-20 units), PEGylated hydrocarbons, N-methoxyisobutyl, where the hydrocarbons are aromatic groups with linear or branch alkyl chains from 4 to 20 carbons in length, $R^7$ is H, poly (ethylene glycol) n (where n is between 2-20 units), PEGylated hydrocarbons, N-methoxyisobutyl, where the hydrocarbons are aromatic groups with linear or branch alkyl chains from 4 to 20 carbons in length, $R^8$ poly (ethylene glycol) n (where n is between 2-20 units), PEGylated hydrocarbons, N-methoxyisobutyl, where the hydrocarbons are aromatic groups with linear or branch alkyl chains from 4 to 20 carbons in length, $R^9$ is O$^-$, OH, NH$_3^+$, sodium salt or neutral version of 2-amino-2-methylpropane-1-sulfonic acid, poly (ethylene glycol) n (where n is between 2-20 units), PEGylated hydrocarbons, N-methoxyisobutyl, where the hydrocarbons are aromatic groups with linear or branch alkyl chains from 4 to 20 carbons in length, $R^{10}$ is H, O$^-$, OH, NH$_3^+$, sodium salt or neutral version of 2-amino-2-methylpropane-1-sulfonic acid, sodium or neutral version of 2-methylpropane-1-sulfonic acid, $R^{11}$ is absent, O$^-$, OH, NH$_3^+$, sodium salt or neutral version of 2-amino-2-methylpropane-1-sulfonic acid, $R^{12}$ is poly (ethylene glycol) n (where n is between 2-20 units), PEGylated hydrocarbons, N-methoxyisobutyl, where the hydrocarbons are aromatic groups with linear or branch alkyl chains from 4 to 20 carbons in length.

The iniferter is selected from the group consisting of:

$R^{1'}$—(C═S)—S—$Z^1$ in which:

$R^{1'}$ is methoxy, ethoxy, n-propoxy, iso-propoxy, n-butoxy, iso-butoxy, t-butoxy, benzyl, phenyl, N-methylaniline;

$Z^1$ is propanoic acid, propanoate, phenylpropane-2-yl, cyanomethyl, cyanopropan-2-yl, and $R^{2'}$—S—(C═S)—S—$Z^2$ in which:

$R^{2'}$ is a linear or branched alkyl chain (carbon length between C1-C12), benzyl, phenyl, isobutyronitrile, propanoate, propanoic acid, benzyl isobutyrate, 2-(pyridin-2-yldisulfanyl) ethyl propionate;

$Z^2$ is propanoate, propanoic acid, methyl, ethyl, propyl, butyl, pentyl, hexyl, phenyl, benzyl, benzyl isobutyrate, PEGylated 2-cyanopropanoic acid (PEG between 50-1000 g/mol).

The iniferter is initiated with light of wavelength between 250-400 nm, preferably 365 nm.

Concentration of the polymerization is 0.5-4.0 M

The general experimental procedure is as follows.

The reaction involves the combination of: monomer A, in a molar ratio percent of 10-98%, the monomer C is in a molar ratio of 5-90%, and the monomer B in a molar ratio of 0.05-10% and a water-soluble UV-initiated iniferter. The reaction mixture is sparged with an inert gas (i.e. nitrogen, argon, helium) for approximately 5-60 mins prior to initiation. The light source of initiation is between 250-400 nm, and temperature is between 5-95° C., and the solvent mixture is comprised of water with organic solvent preferably in a ratio of 100:0-1:99, where the secondary solvent is very to somewhat miscible with water and is polar protic or polar aprotic. The reaction typically takes between 1-12 hours depending on the types of monomers and ratio of monomers.

The following are to be regarded as non-limiting examples of terpolymer syntheses according to embodiments of the invention:

See FIG. 1. Example of synthetic method for the production of hydrophobically associating terpolymers.

Example 1

Monomer A 74.5 mmol, Monomer C is 25.0 mmol, and Monomer B 0.5 mmol, more specifically acrylamide (5.30 g) and sodium acrylate (2.42 g), and N-(isobutoxymethyl) acrylamide (0.08 g) were used for the synthesis of a terpolymer. The monomers were dissolved in 50 mL of $H_2O$ in a 100 mL schlenk flask. Initiator stock solution (416 µL of 1 mg/mL in DMSO) was added to the monomer solution. The reaction mixture was sparged with $N_2$ for 30 mins before it was irradiated with 365 nm wavelength light to initiate the reaction and left to stir for 6 hours. After 15 mins the mixture became a transparent viscous gel.

Example 2

Monomer A 74.0 mmol, Monomer C is 25.0 mmol, and Monomer B 1.0 mmol, where monomer A is acrylamide (5.26 g), monomer C is sodium acrylate (2.42 g), and N-(isobutoxymethyl) acrylamide (0.016 g) were used for the synthesis of a terpolymer. The monomers were dissolved in 50 mL of $H_2O$ in a 100 mL schlenk flask. Initiator stock solution (416 µL of 1 mg/mL in DMSO) was added to the monomer solution. The reaction mixture was sparged with $N_2$ for 30 mins before it was irradiated with 365 nm wavelength light to initiate the reaction and left to stir for 6 hours. After 30 mins the mixture became a transparent viscous gel.

Example 3

Monomer A 73.0 mmol, Monomer C is 25.0 mmol, and Monomer B 2.0 mmol, more specifically acrylamide (5.19 g) and sodium acrylate (2.42 g), and N-(isobutoxymethyl) acrylamide (0.324 g) were used for the synthesis of a terpolymer. The monomers were dissolved in 50 mL of $H_2O$ in a 100 mL schlenk flask. Initiator stock solution (416 µL of 1 mg/mL in DMSO) was added to the monomer solution. The reaction mixture was sparged with $N_2$ for 30 mins before it was irradiated with 365 nm wavelength light to initiate the reaction and left to stir for 6 hours. After 15 mins the mixture became a transparent viscous gel.

Example 4

Monomer A 71.0 mmol, Monomer C is 25.0 mmol, and Monomer B 4.0 mmol, more specifically acrylamide (5.05 g) and sodium acrylate (2.42 g), and N-(isobutoxymethyl) acrylamide (0.065 g) were used for the synthesis of a terpolymer. The monomers were dissolved in 50 mL of $H_2O$ in a 100 mL schlenk flask. Initiator stock solution (416 µL of 1 mg/mL in DMSO) was added to the monomer solution. The reaction mixture was sparged with $N_2$ for 30 mins before it was irradiated with 365 nm wavelength light to initiate the reaction and left to stir for 6 hours. After 30 mins the mixture became a transparent viscous gel.

Figure 2:
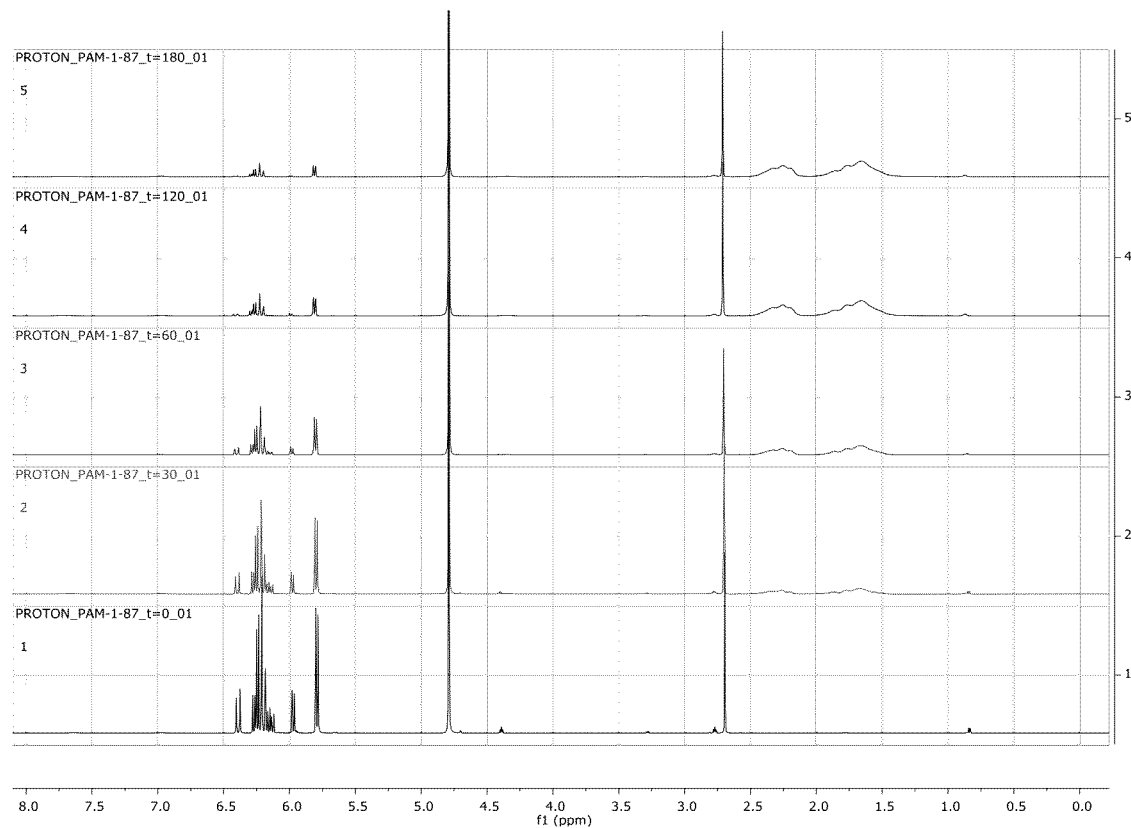
FIG. 2: $^1$H-NMR of polymerization in deuterated water demonstrating the kinetics of the reaction.

See FIG. 2. $^1$H-NMR of polymerization in deuterated water demonstrating the kinetics of the reaction based on Example 4. The progress of the reaction is from bottom to top with the time intervals of 0, 30, 60, 120, and 180 mins.

Example 5

Monomer A 37.25 mmol, Monomer C is 12.5 mmol, and Monomer B 0.25 mmol, more specifically acrylamide (2.65 g) and 2-acrylamido-2-methylpropane sulfonic acid sodium salt (4.75 mL of 50% solution in water), and N-(isobutoxymethyl) acrylamide (0.041 g), respectively, were used for the synthesis of a terpolymer. The monomers were dissolved in 50 mL of $H_2O$ in a 100 mL schlenk flask. Initiator stock solution (416 µL of 1 mg/mL in DMSO) was added to the monomer solution. The reaction mixture was sparged with $N_2$ for 30 mins before it was irradiated with 365 nm wavelength light to initiate the reaction and left to stir for 6 hours. After 30 mins the mixture became a transparent viscous gel.

Example 6

Monomer A 74.5 mmol, Monomer C is 25.0 mmol, and Monomer B 0.5 mmol, more specifically acrylamide (2.65 g) and 2-acrylamido-2-methylpropane sulfonic acid sodium salt (4.78 mL of 50% solution in water), and N-(isobutoxymethyl) acrylamide (0.405 g), respectively, were used for the synthesis of a terpolymer. The monomers were dissolved in 50 mL of $H_2O$ in a 100 mL schlenk flask. Initiator stock solution (416 µL of 1 mg/mL in DMSO) was added to the monomer solution. The reaction mixture was sparged with $N_2$ for 30 mins before it was irradiated with 365 nm wavelength light to initiate the reaction and left to stir for 6 hours. After 30 mins the mixture became a transparent viscous gel.

Example 7

Monomer A 74.9 mmol, Monomer C is 5.0 mmol, and Monomer B 0.1 mmol, more specifically acrylamide (10.60 g) and 2-acrylamido-2-methylpropane sulfonic acid sodium salt (19 mL of 50% solution in water), and N-(isobutoxymethyl) acrylamide (0.162 g), respectively, were used for the synthesis of a terpolymer. The monomers were dissolved in 50 mL of $H_2O$ in a 100 mL schlenk flask. Initiator stock solution (416 µL of 1 mg/mL in DMSO) was added to the monomer solution. The reaction mixture was sparged with $N_2$ for 30 mins before it was irradiated with 365 nm wavelength light to initiate the reaction and left to stir for 6 hours. After 30 mins the mixture became a transparent viscous gel.

Example 8

Monomer A 73.0 mmol, Monomer C is 25.0 mmol, and Monomer B 2.0 mmol, more specifically acrylamide (5.19 g) and acrylic acid (1.80 g), and N-(isobutoxymethyl) acrylamide (0.324 g) were used for the synthesis of a terpolymer. The monomers were dissolved in 50 mL of $H_2O$ in a 100 mL schlenk flask. Initiator stock solution (416 µL of 1 mg/mL in DMSO) was added to the monomer solution. The reaction mixture was sparged with $N_2$ for 30 mins before it was irradiated with 365 nm wavelength light to initiate the reaction and left to stir for 6 hours. After 15 mins the mixture became a transparent viscous gel.

Example 9

Monomer A 74.5 mmol, Monomer C is 25.0 mmol, and Monomer B 0.5 mmol, more specifically acrylamide (5.30 g) and 2-acrylamido-2-methylpropane sulfonic acid (5.18 g), and N-(isobutoxymethyl) acrylamide (0.081 g), respectively, were used for the synthesis of a terpolymer. The monomers were dissolved in 50 mL of $H_2O$ in a 100 mL schlenk flask. Initiator stock solution (416 µL of 1 mg/mL in DMSO) was added to the monomer solution. The reaction mixture was sparged with $N_2$ for 30 mins before it was irradiated with 365 nm wavelength light to initiate the reaction and left to stir for 3 hours. After 30 mins the mixture became a transparent viscous gel.

Example 10

Monomer A 74.9 mmol, Monomer C is 25.0 mmol, and Monomer B 0.1 mmol, more specifically acrylamide (5.33 g) and 2-acrylamido-2-methylpropane sulfonic acid (5.18 g), and poly (oxyethylene) 12 nonylphenylether acrylate (0.109 g), respectively, were used for the synthesis of a terpolymer. The monomers were dissolved in 50 mL of $H_2O$ in a 100 mL schlenk flask. Initiator stock solution (416 µL of 1 mg/mL in DMSO) was added to the monomer solution. The reaction mixture was sparged with $N_2$ for 30 mins before it was irradiated with 365 nm wavelength light to initiate the reaction and left to stir for 3 hours. After 30 mins the mixture became a transparent viscous gel.

Surprisingly, embodiments of this invention were able to address all the desired properties of a hydrophobically associative terpolymer.

TABLE 1

Composition of monomers in mol during the polymerization over a period of 3 hours with monomer consumption based on monomer integration values relative to residual DOH. The experiment was based off a similar method to Example 4.

| Time (min) | Amount of monomer in (mol) | | | Monomer consumption (%) |
|---|---|---|---|---|
| | Monomer A | Monomer B | Monomer C | |
| 0 | 0.763 | 0.234 | 0.004 | 0 |
| 30 | 0.530 | 0.129 | 0.003 | 34 |
| 60 | 0.311 | 0.058 | 0.003 | 63 |
| 120 | 0.112 | 0.013 | 0.002 | 87 |
| 180 | 0.068 | 0.006 | 0.001 | 93 |

By monitoring the reaction kinetics by 1H-NMR is deuterated water, a profile of the reactivity was able to be determined (FIG. 2, and Table 1).

This invention demonstrates 98% conversion of monomers to polymers within 2 hours reaction time. The total consumption of the monomer based on moles in the reaction medium when plotted in a pseudo-first order reaction kinetic style demonstrates a near-linear behavior (FIG. 3).

Figure 3:
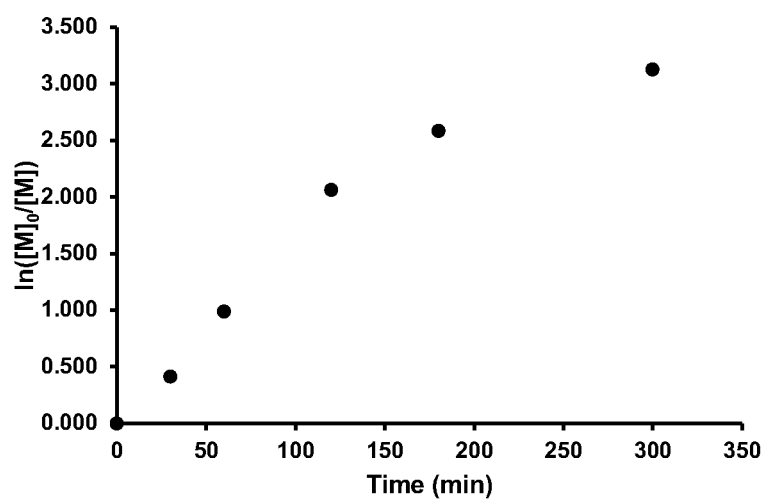
FIG. 3: Pseudo-first-order kinetic plot indicating near-linear behaviour up to 120 mins (98% conversion).

FIG. 3 shows a pseudo-first-order kinetic plot indicating near-linear behaviour up to 120 mins, with reaction nearing completion at 180 mins (93%) and reaching full conversion at 300 min. The deviation from linearity is most likely due to lack of diffusion control of the reaction once a viscous gel is formed.

The reaction deviates from linearity after 120 mins, most likely due to the loss of diffusion control within the reaction medium due to the viscous nature of the polymers being synthesized. These results suggest that the RAFT reaction behaves as a controlled radical polymerization. This allowed the ability to control the molecular weight of the polymer to tailor the molecular weight to suit the viscosity requirements for our specific application.

To probe the molecular weight characteristics of these polymers triple detection gel permeation chromatography was used (TD-GPC). A Tosoh ambient GPC model 8220 with refractive index (RI) detector and dual-flow technology was used equipped with a Viscotek TDA 302 that included a viscometer, low-angle and right-angle light scattering detector (LALS and RALS, respectively), used to measure absolute molecular weights. The GPC was equipped with a TSKgel αM sample column and TSKgel superH-RC as reference columns. The sample flow rate was set to 0.750 mL/min, the reference flow rate was set to 0.325 mL/min, and the temperature of all the detectors was set to 30° C. The terpolymer samples were prepared in 2% KCl, dissolved for 24 hours on a rocker, filtered with a nylon 0.45 µm syringe filter. The TD-GPC was calibrated using a 20 kDa poly (ethyleneoxide) narrow standard and a 72 kDa dextran broad standard.

The viscosity measurements were acquired by diluting the terpolymer samples at a concentration of 3.5 g/L in fresh water. The dissolution process was expedited by mixing the solution in a stand mixer for 1-5 minutes, allowed to settle to remove air bubbles. The viscosity of the solution was measured by rotational viscometry using a Brookfield viscometer equipped with a spindle appropriate for the relative viscosities of the polymer solutions. The salt solutions of polymers were prepared by adding 2% KCl or 2% Sea water (w/w) to the dissolved fresh water solutions.

For Example 1, the polymer was dissolved at a concentration of 0.1 mg/mL in a 2% aqueous KCl solution and injected into a TD-GPC system the following absolute molecular weight parameters: Mw=$2.20\times10^6$ g mol$^{-1}$, and a Đ=1.255. Based on GPC viscometry data, the intrinsic viscosity (IV) was measured to be 8.52 dl/g.

A terpolymer with a molar ratio of monomer A to monomer C to mono B of 73.0:25.0:2.0 (Example 8) prepared for TD-GPC analysis at a concentration of 0.1 mg/mL and gave the following absolute molecular weight parameters: $M_w$=$4.62\times10^6$ g mol$^{-1}$, and Đ=1.059. The IV of this terpolymer was measured to be 12.4 dl/g.

TABLE 2

Summary of molecular weight data and IV values for terpolymers from Examples 1-9.

| Example | Mw ($\times10^6$ g mol$^{-1}$) | Đ | IV (dl/g) |
|---|---|---|---|
| 1 | 3.31 | 1.255 | 10.6 |
| 2 | 3.78 | 1.289 | 14.5 |
| 3 | 3.58 | 1.216 | 13.9 |
| 4 | 3.56 | 1.258 | 13.7 |
| 5 | 2.09 | 1.416 | 6.9 |
| 6 | 3.65 | 1.290 | 10.4 |
| 7 | 4.40 | 1.251 | 9.6 |
| 8 | 4.62 | 1.059 | 12.4 |
| 9 | 4.33 | 1.063 | 12.8 |
| 10 | 1.48 | 3.994 | 4.5 |

As demonstrated, embodiments of methods of this invention, can control the molecular weights consistent with a controlled radical polymerization using our specific combination of reagents, including monomer A, monomer C, monomer B, and the UV active iniferter, as well as conditions and concentration detailed above.

The storage modulus (G'), loss modulus (G"), and flow curves were analyzed for polymers in Examples 2, 9, 4, and 8. The samples were prepared by stirring the dried powder forms of the polymers at a concentration of 4000 ppm in water for 48 hours. The rheological measurements were carried out on an Anton Paar MCR302 rotational rheometer with a coaxial cylinder geometry and the Rheoplus/32 V3.62 software. Rotational rheometry enables us to subject a sample to either a dynamic (sinusoidal) or steady shear deformation and then measure the torque response to the applied deformation filed. The measuring bob and measuring cup had a radius of 13.329 mm OD and 14.463 mm ID, respectively. All the rheological measurements were done at a fixed temperature (T=25° C.). The temperature for high temperature solutions was at T=70° C. The frequency sweep test was performed within the linear viscoelastic region (LVR). The strain amplitude was set to 0.1% for frequency sweep tests over an angular frequency range of 0.1 rad/s-10 rad/s. The strain amplitude in oscillatory experiments was selected in a way to ensure that samples remain in the LVR all the time. On the other hand, strain amplitude test was done in both LVR and the nonlinear viscoelastic region (non-LVR). Strain amplitude sweep test was intended to investigate nonlinear viscoelasticity under large amplitude oscillatory shear (LAOS) flow. To avoid any flow instability, torque overload and wall-slip effects, angular frequency was set to 0.5 rad/s; and strain amplitude was varied between 1% and 1000%. Local elastic and viscous responses of a material at small and large instantaneous strains and strain-rates were collected after 5-7 cycles for each strain amplitude value to ensure a stationary viscoelastic response was achieved. The average of these measurements was reported by the rheometer software.

Figure 5:
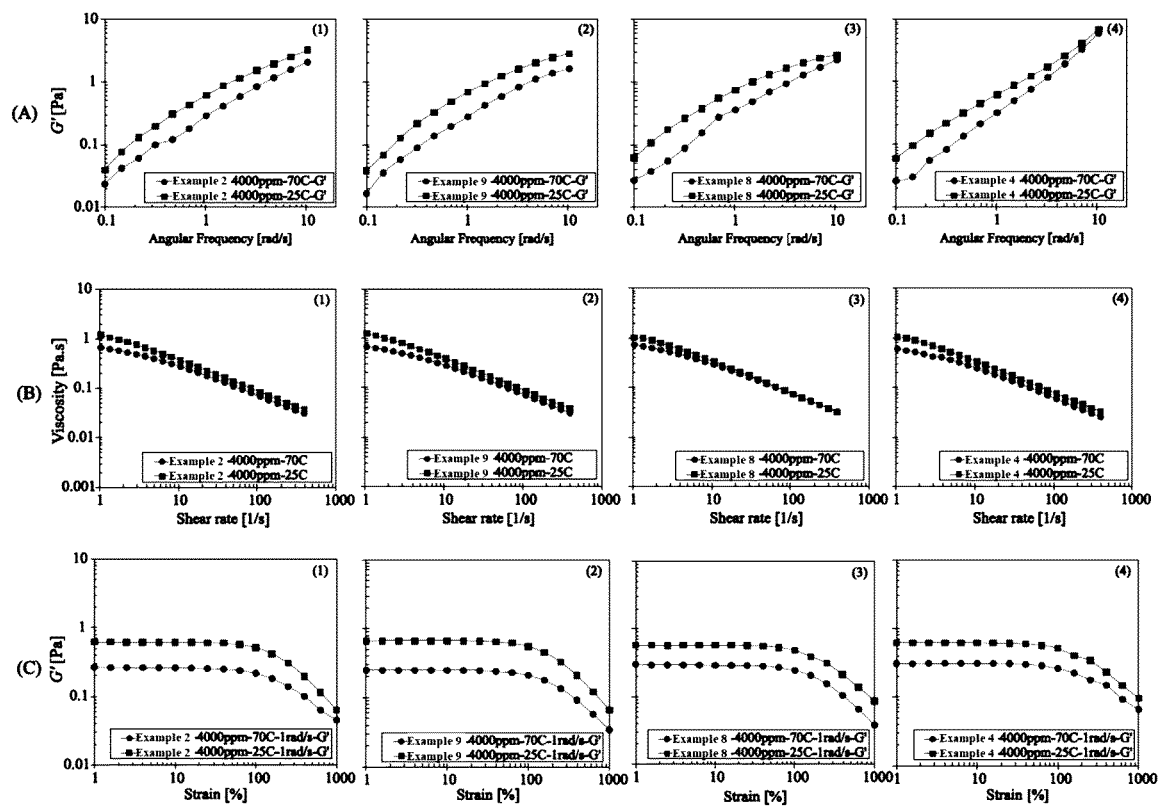
FIG. 5: (A) Frequency sweep test, (B) flow curve, and (C) strain sweep tests for all terpolymers aqueous solution. The squares and circles represent 25° C. and 70° C., respectively. The polymers analyzed include Example 9, Example 2, Example 8, and Example 4. All the rheological tests were carried out in triplicate or quadruplicate for each solution, and the average for each result is presented in this study. For figures in log-log scale, the errors are within the data point markers, and cannot be observed.

The data from FIG. 5 for Examples 2, 9, 4, and 8 show a G'>G" for higher frequencies, and G">G' for lower frequencies, which shows they exhibit viscoelastic behaviors at 4000 ppm. To investigate the effect of a change in temperature of the polymers presented in Examples 2, 9, 4, and 8, frequency sweep, strain sweep and flow curve tests were conducted at two different temperatures (25° C. and 70° C.). The change in viscosity between 25° C. and 70° C. shows a decrease of about 10% between all the examples. These tests indicate that these polymers viscoelastic behaviour which is ideal for their potential application as a propagation agent.

To demonstrate control over molecular weight three experiments were performed by varying the maintaining the amount of iniferter (Example 5, 6, and 7) in the reaction mixture while varying the concentration of monomer A, monomer C, and monomer B in solution to 1.0, to 2.0, and 4.0 total mols present, respectively. These experiments yielded terpolymers with different experimental molecular weights, 2.09, 3.65, and 4.40×10⁶ g mol⁻¹ for Examples 5, 6, and 7, respectively. These experiments demonstrate that this synthetic methodology gives the ability to tailor the molecular weight and therefore the rheological properties based on the desired function (Drawing 4).

Figure 4:
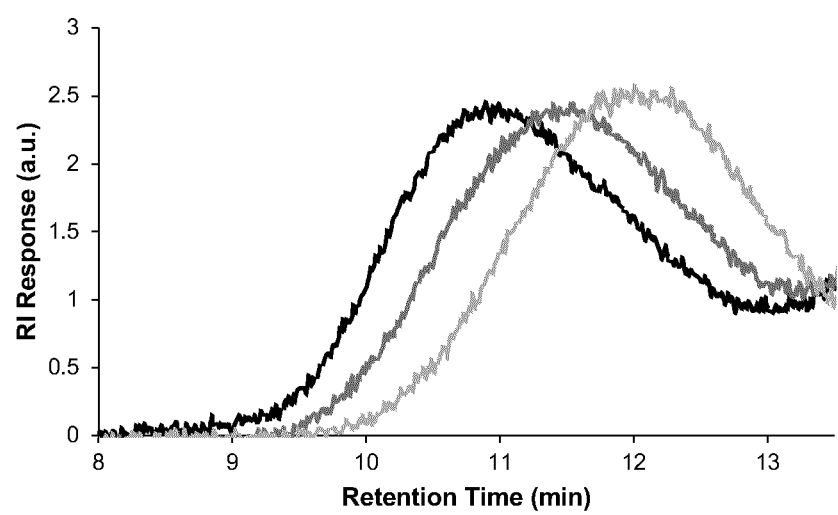
FIG. 4: GPC traces of the RI response displaying molecular weight of polymers with different targeted weight average molecular weights for Examples 5, 6, and 7.

FIG. 4 shows GPC traces of the RI response displaying molecular weight of polymers with different targeted weight average molecular weights for Examples 5 (black), 6 (dark gray), and 7 (light gray).

Viscometry data for the solution of the terpolymers were acquired by preparing solutions in deionized water at a concentration of 3.5 g/L using a Brookfield rotational viscometer. The terpolymer from Example 1 with a molar ratio of monomer A to monomer C to monomer B of 74.5:25.0:0.5 gave a value of 1100 cP at 0.1 s⁻¹. When salt was introduced into the aqueous mixture with 2% KCl (w/w) and 2% sea water (w/w), it introduced a viscosity of 32 and 24 cP respectively.

TABLE 3

Viscosity measurements for Examples 1-10 at a rate of 0.1 s⁻¹ using a Brookefield rotational viscometer.

| | Viscosity (cP) | | |
|---|---|---|---|
| Example | Fresh water | 2% KCl (w/w) | Sea Water (2% w/w) |
| 1 | 1100 | 32 | 24 |
| 2 | 1330 | 40 | 29 |
| 3 | 1200 | 36 | 29 |
| 4 | 1000 | 33 | 23 |
| 5 | 430 | 16 | 24 |
| 6 | 1400 | 28 | 24 |
| 7 | 2660 | 51 | 44 |
| 8 | 1010 | 33 | 28 |
| 9 | 1600 | 43 | 37 |
| 10 | 2660 | 12 | 12 |

Prior art in the field of rheological modifying polymers can produce polymers with similar composition, however the prior art does not address all the solutions that the many embodiments of the current invention encompasses.

Taton et al. described the synthesis of di- and tri-block copolymers with a system using a RAFT/MADIX technology. The inventors, however, were only able to produce polymers with molecular weight around 10,000 g mol⁻¹. The embodiments of our invention are able to produce polymers with molecular weights ranging from 1 to 10×10⁶ g mol⁻¹ with a faster reaction time and less reagents.

As described in the prior art by Carmean et al. they have shown the ability to synthesize a polymer with a UV initiated RAFT agent to produce a polymer with UHMW, although they do demonstrate the ability to change the types of monomers used and they do not demonstrate the synthesis of copolymers or terpolymer. One of the main difficulties of the aqueous synthesis of polymers designed to thicken aqueous solutions is the ability to process and characterize these macromolecules. Our invention details the synthesis of this difficult technique but also has allowed us to fully characterize the molecular weight properties of these terpolymers.

Previous inventions including Read et al. and Cadix et al. produced terpolymers with UHMW, however, these polymers required the use of reagents to create micelles to allow the inventors to integrate hydrophobic groups (as embodiments of our invention described Monomer B). These procedures also require low temperature and multi-component RED/OX initiator systems. These extra reagents and steps to produce micelles increase the cost and reduce the efficiency of their reactions.

The various embodiments of this invention afford advantages over prior inventions due to the novel methodology to produce the terpolymers. The specific combination of reagents and conditions allow this invention the ability to produce terpolymers of different targeted molecular weights, narrow PDIs, straightforward and relatively fast synthesis in aqueous media. Moreover, the iniferter system also allows the ability to incorporate different monomers at different molar ratios to create a terpolymer with the desired rheological properties in a one-pot synthetic strategy.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A terpolymer resulting from aqueous polymerization of a mixture of:
    monomer A, having a water-soluble monoethylenically unsaturated group consisting of $R^1$—(C—C)—(C=O)—N—($R^3$)—$R^4$ wherein $R^1$ is H;
    $R^3$ is H; and
    $R^4$ is H;
    monomer B, having a monoethylenically unsaturated monomer capable of forming hydrophobically associative bonds in aqueous medium and amenable to aqueous polymerization conditions consisting of $R^1$—(C=C)—(C—O)—N—($R^6$)—$R^7$ wherein $R^1$ is H;
    $R^6$ is A-methoxyisobutyl,
    $R^7$ is H; and
    monomer C, having an ionic water-soluble monoethylenically unsaturated group, said monomer C consisting of $R^3$—(C—C)—(C—O)—N—($R^{10}$)—$R^{11}$ wherein $R^3$ is H;
    $R^{10}$ is sodium salt of 2-methylpropane-1-sulfonic acid;
    $R^{11}$ is H; and
    an iniferter initiated with light selected from the group comprising $R^{1'}$-(C—S)—S—$Z^1$ or $R^{2'}$—S—(C=S)—S—$Z^2$ wherein:
        $R^{1'}$ is selected from the group consisting of: methoxy, ethoxy, n-propoxy, iso-propoxy, n-butoxy, iso-butoxy, t-butoxy, benzyl, phenyl, N-methylaniline,
        $Z^1$ is selected from the group consisting of: propanoic acid, propanoate, phenylpropane-2-yl, cyanomethyl, cyanopropan-2-yl,
        $R^{2'}$ is selected from the group consisting of: is a linear or branched alkyl chain having a carbon length between C1-C12, benzyl, phenyl, isobutyronitrile, propanoate, propanoic acid, benzyl isobutyrate, 2-(pyridin-2-yldisulfanyl) ethyl propionate,
        $Z^2$ is selected from the group consisting of: propanoate, propanoic acid, methyl, ethyl, propyl, butyl, pentyl, hexyl, phenyl, benzyl, benzyl isobutyrate, polyethyleneglcoylated 2-cyanopropanoic acid.

2. The terpolymer of claim 1, having a viscosity greater than 1000 cP in fresh water.

3. The terpolymer according to claim 1, wherein the monomer A is present in an amount of from 25.0-99.9% by mol, the monomer C is present in an amount of from 25.0-99.9% by mol, and the monomer B is present in an amount of from 0.1-5.0% by mol, each based on the total molar amount of all components in the copolymer.

4. A method comprising thickening a water-based solution by adding thereto a sufficient amount of the terpolymer according to claim 1 to thicken the water-based solution.

5. The method according to claim 4, wherein the solution is used to develop or exploit to completion subterranean mineral oil deposits or natural gas deposits.

6. The method according to claim 4, where the solution is used to transport a proppant, typically sand, treated sand, or man-made ceramic materials.

7. The method according to claim 6, wherein the proppant functions to keep an induced hydraulic fracture open.

8. The method according to claim 4, to enhance oil recovery by injecting the water-based solution in a concentration of 0.01-5% by weight through at least one injection well into a mineral oil deposit; and removing crude oil from the deposit through at least one production well.

9. The method according to claim 4, to increase viscosity of a mixture for use in the cosmetic industry.

10. The method according to claim 4, to create a viscous mixture for use as a pharmaceutical additive.

11. Use of the terpolymer according to claim 1 to enhance oil recovery by injecting the water-based solution comprising the terpolymer in a concentration of 0.01-5% by weight through at least one injection well into a mineral oil deposit; and removing crude oil from the deposit through at least one production well.

12. The terpolymer of claim 1, wherein said terpolymer has an average molecular weight $>1.0\times10^6$ g $mol^1$.

13. The terpolymer of claim 1, wherein said iniferter is initiated with light of wavelength between 250-400 nm.

14. The terpolymer according to claim 1 having a viscosity equal to or greater than 23 cP in sea water (2% w/w) at a shear rate of 0.1 $s^{-1}$.

* * * * *